US012786821B2

(12) United States Patent
Fujishiro et al.

(10) Patent No.: US 12,786,821 B2
(45) Date of Patent: Nov. 3, 2026

(54) COMMUNICATION CONTROL METHOD FOR INTER-LAYER NOTIFICATION OF SLICE RELATED INFORMATION

(71) Applicant: KYOCERA Corporation, Kyoto (JP)

(72) Inventors: Masato Fujishiro, Yokohama (JP); Mitsutaka Hata, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 288 days.

(21) Appl. No.: 18/430,030

(22) Filed: Feb. 1, 2024

(65) Prior Publication Data

US 2024/0196285 A1 Jun. 13, 2024

Related U.S. Application Data

(63) Continuation of application No. PCT/JP2022/029639, filed on Aug. 2, 2022.

(30) Foreign Application Priority Data

Aug. 5, 2021 (JP) ................................ 2021-128836

(51) Int. Cl.
*H04W 36/00* (2009.01)
*H04W 36/08* (2009.01)
(Continued)

(52) U.S. Cl.
CPC .............. *H04W 36/008355* (2023.05); *H04W 36/0072* (2013.01); *H04W 36/08* (2013.01); *H04W 76/20* (2018.02); *H04W 84/042* (2013.01)

(58) Field of Classification Search
CPC ..... H04W 36/008355; H04W 36/0072; H04W 36/08; H04W 76/20; H04W 84/042;
(Continued)

(56) References Cited

U.S. PATENT DOCUMENTS 11,051,233 B2 6/2021 Futaki et al.
11,729,700 B2 8/2023 Futaki et al.
(Continued)

FOREIGN PATENT DOCUMENTS

WO 2018/128020 A1 7/2018
WO 2019/225914 A1 11/2019

OTHER PUBLICATIONS

CMCC; "Discussion on slice based RACH configuration"; 3GPP TSG-RAN WG2 Meeting #114-e; R2-2106225; Electronic meeting; May 19-27, 2021; total 7 pages.
(Continued)

*Primary Examiner* — Jenee Holland
(74) *Attorney, Agent, or Firm* — Studebaker Brackett PLLC

(57) ABSTRACT

In a first aspect, a communication control method is used in a mobile communication system including a user equipment and a base station, and being capable of performing wireless communication between the user equipment and the base station. The communication control method includes receiving, by a first layer of a user equipment in a Radio Resource Control (RRC) idle state or an RRC inactive state, system information from the base station. The communication control method includes notifying, by the first layer of the user equipment, a second layer higher than the first layer of at least one of first information indicating whether slice-specific cell reselection is available and second information indicating whether a slice-specific random access channel is available, based on the system information.

17 Claims, 8 Drawing Sheets

(51) Int. Cl.

| | |
|---|---|
| ***H04W 48/10*** | (2009.01) |
| ***H04W 48/16*** | (2009.01) |
| ***H04W 48/18*** | (2009.01) |
| ***H04W 74/08*** | (2024.01) |
| ***H04W 76/20*** | (2018.01) |
| ***H04W 76/27*** | (2018.01) |
| ***H04W 84/04*** | (2009.01) |

(58) Field of Classification Search
CPC ..... H04W 48/10; H04W 48/16; H04W 48/18; H04W 74/08; H04W 76/27
See application file for complete search history.

(56) References Cited

U.S. PATENT DOCUMENTS

| | | | | |
|---|---|---|---|---|
| 2015/0223052 | A1* | 8/2015 | Rosa | H04L 5/0035 455/419 |
| 2015/0249900 | A1* | 9/2015 | Kim | H04W 24/10 370/252 |
| 2018/0255484 | A1* | 9/2018 | Wu | H04B 7/0413 |
| 2019/0320485 | A1* | 10/2019 | Kim | H04W 76/25 |
| 2020/0137680 | A1 | 4/2020 | Byun et al. | |
| 2021/0127437 | A1* | 4/2021 | Aijaz | H04W 48/18 |
| 2022/0232047 | A1* | 7/2022 | Chin | H04L 65/1016 |
| 2023/0030150 | A1* | 2/2023 | Shih | H04W 76/30 |
| 2023/0037553 | A1* | 2/2023 | Shih | H04W 36/13 |
| 2023/0055788 | A1* | 2/2023 | Jung | H04W 36/0061 |
| 2023/0092324 | A1* | 3/2023 | Seidel | H04W 74/0833 370/329 |
| 2023/0180301 | A1* | 6/2023 | Seidel | H04W 74/006 370/329 |
| 2023/0254745 | A1* | 8/2023 | Fujishiro | H04W 36/08 370/331 |
| 2023/0300738 | A1* | 9/2023 | Liu | H04W 36/08 370/329 |
| 2023/0308363 | A1* | 9/2023 | Ishii | H04W 48/18 |
| 2023/0328794 | A1* | 10/2023 | Cheng | H04W 74/0833 370/329 |
| 2023/0354159 | A1 | 11/2023 | Futaki et al. | |
| 2023/0370922 | A1* | 11/2023 | Yang | H04W 48/18 |
| 2023/0370926 | A1* | 11/2023 | Fu | H04W 36/13 |
| 2023/0388908 | A1* | 11/2023 | Wang | H04W 48/14 |
| 2023/0403642 | A1* | 12/2023 | Lu | H04W 60/04 |
| 2024/0007919 | A1* | 1/2024 | Liu | H04W 48/18 |
| 2024/0064817 | A1* | 2/2024 | Löhr | H04W 74/006 |
| 2024/0205729 | A1* | 6/2024 | Liu | H04W 48/16 |
| 2025/0097833 | A1* | 3/2025 | Ishii | H04W 48/18 |
| 2025/0386264 | A1* | 12/2025 | Tiwari | H04W 36/08 |

OTHER PUBLICATIONS

Xiaomi; "Considerations on slice based cell reselection"; 3GPP TSG-RAN WG2 Meeting #114 electronic; R2-2104782; Online; May 19-27, 2021; total 5 pages.

3rd Generation Partnership Project; Technical Specification Group Radio Access Network; NR; NR and NG-RAN Overall Description; Stage 2 (Release 16); 3GPP TS 38.300 V16.6.0; Jun. 2021; pp. 1-152.

OPPO; "Consideration on slice-specific cell reselection"; 3GPP TSG RAN WG2 #114-e; R2-2105568; E-meeting; May 2021; pp. 1-5.

* cited by examiner

COMMUNICATION CONTROL METHOD FOR INTER-LAYER NOTIFICATION OF SLICE RELATED INFORMATION

RELATED APPLICATIONS

The present application is a continuation based on PCT Application No. PCT/JP2022/029639, filed on Aug. 2, 2022, which claims the benefit of Japanese Patent Application No. 2021-128836 filed on Aug. 5, 2021. The content of which is incorporated by reference herein in their entirety.

TECHNICAL FIELD

The present disclosure relates to a communication control method used in a mobile communication system.

BACKGROUND OF INVENTION

In the Third Generation Partnership Project (3GPP), which is a standardization project for mobile communication systems, specifications of network slicing (or network slice) have been drafted.

Network slicing is a concept that allows differentiated processing in accordance with each customer's needs. Network slicing is also a technique for virtually slicing a network so as to efficiently provide a network in accordance with requirements of services used by customers.

CITATION LIST

Non-Patent Literature

Non-Patent Document 1: 3GPP TS 38.300 V16.6.0 (2021-06)

SUMMARY

In a first aspect, a communication control method is used in a mobile communication system including a user equipment and a base station, and being capable of performing wireless communication between the user equipment and the base station. The communication control method includes receiving, by a first layer of a user equipment in a Radio Resource Control (RRC) idle state or an RRC inactive state, system information from a base station. The communication control method includes notifying, by the first layer of the user equipment, a second layer higher than the first layer of at least one of first information indicating whether slice-specific cell reselection is available and second information indicating whether a slice-specific random access channel is available, based on the system information.

In a second aspect, a communication control method is used in a mobile communication system including a user equipment and a base station, and being capable of performing wireless communication between the user equipment and the base station. The communication control method includes notifying, by a first layer of a user equipment in an RRC connected state with a base station, a second layer higher than the first layer of at least one of third information indicating whether a parameter related to slice-specific cell reselection has been acquired and fourth information indicating whether a parameter for slice-specific random access channel has been acquired. The communication control method includes notifying, by the second layer of the user equipment, the first layer of fifth information indicating whether to maintain the user equipment in the RRC connected state or to transition the user equipment to an RRC idle state or an RRC inactive state, based on at least one of the third information or the fourth information. The communication control method further includes transmitting, by the first layer, the fifth information to the base station.

In a third aspect, a communication control method is used in a mobile communication system including a user equipment and a base station, and being capable of performing wireless communication between the user equipment and the base station. The communication control method includes performing, by a first layer of a user equipment in an RRC idle state or an RRC inactive state, slice-specific cell reselection. The communication control method includes notifying, by the first layer, a second layer higher than the first layer of a completion notification, when the first layer completes the slice-specific cell reselection.

DESCRIPTION OF EMBODIMENTS

The present disclosure provides a communication control method capable of appropriately exchanging information related to a slice between an Access Stratum (AS) and a Non-Access Stratum (NAS).

A mobile communication system according to an embodiment is described with reference to the drawings. In the description of the drawings, the same or similar parts are denoted by the same or similar reference signs.

Mobile Communication System

First, a configuration of a mobile communication system in an embodiment is described. Although the mobile communication system according to the embodiment is a 5G system of the 3GPP, LTE may be at least partially applied to the mobile communication system. Future mobile communication systems such as the 6G may be applied to the mobile communication system.

Figure 1:
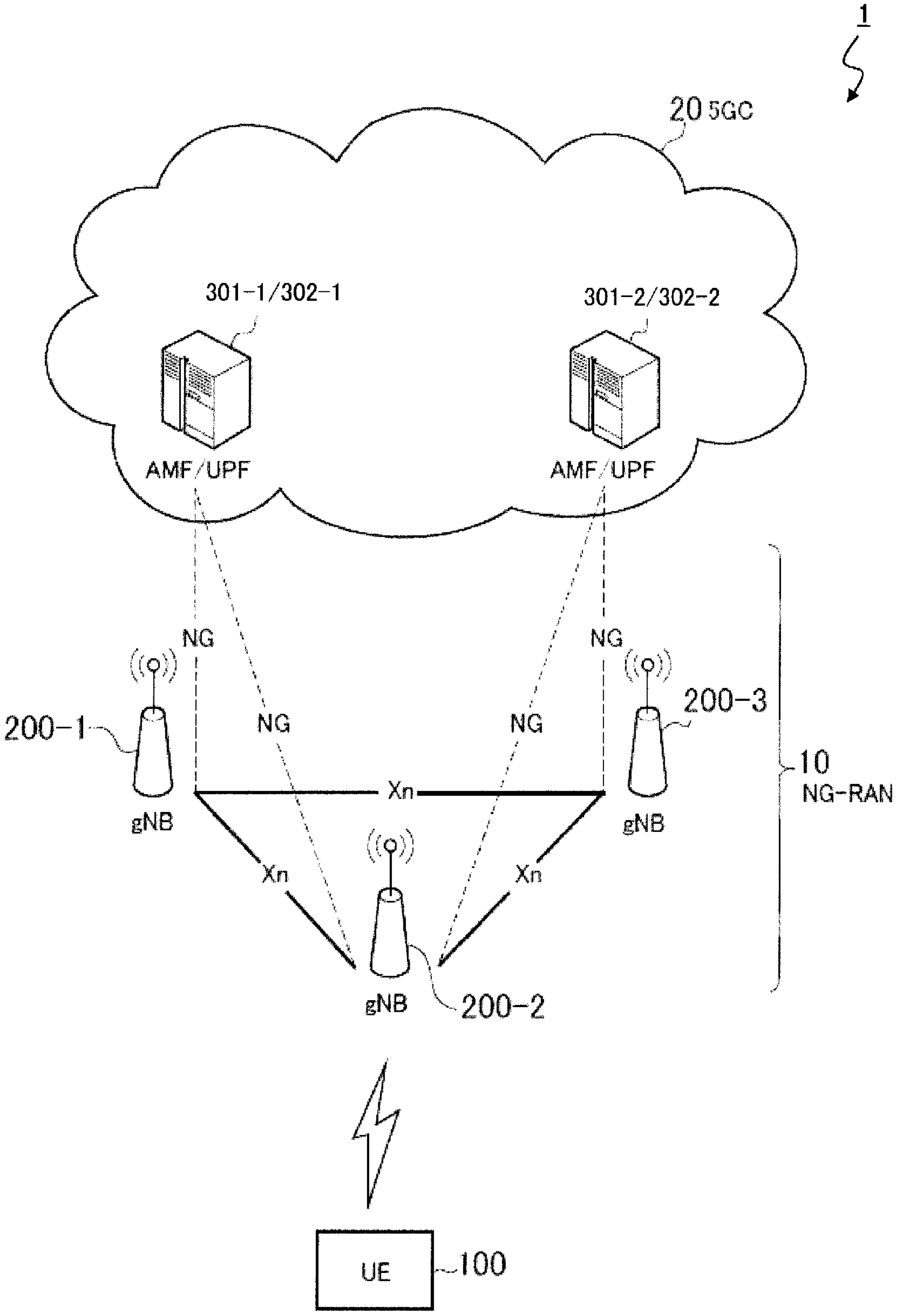
FIG. 1 is a diagram illustrating a configuration example of a mobile communication system according to an embodiment.

FIG. 1 is a diagram illustrating a configuration example of a mobile communication system 1 according to an embodiment.

As illustrated in FIG. 1, the mobile communication system 1 includes a User Equipment (UE) 100, a 5G radio access network (Next Generation Radio Access Network (NG-RAN)) 10, and a 5G Core Network (5GC) 20.

The UE 100 is a mobile apparatus. The UE 100 may be any apparatus as long as the UE 100 is used by a user. Examples of the UE 100 include a mobile phone terminal (including a smartphone), or a tablet terminal, a notebook PC, a communication module (including a communication card or a chipset), a sensor or an apparatus provided on a sensor, a vehicle or an apparatus provided on a vehicle (Vehicle UE), or a flying object or an apparatus provided on a flying object (Aerial UE).

The NG-RAN 10 includes base stations (referred to as "gNBs" in the 5G system) 200. The gNBs 200 may also be referred to as NG-RAN nodes. The gNBs 200 are interconnected via an Xn interface which is an inter-base station interface. Each gNB 200 manages one or more cells. The gNB 200 performs wireless communication with the UE 100 that has established a connection to the cell of the gNB 200. The gNB 200 has a radio resource management (RRM) function, a function of routing user data (hereinafter simply referred to as "data"), a measurement control function for mobility control and scheduling, and the like. The "cell" is used as a term representing a minimum unit of a wireless communication area. The "cell" is also used as a term representing a function or a resource for performing wireless communication with the UE 100. One cell belongs to one carrier frequency.

Note that the gNB 200 may be connected to an Evolved Packet Core (EPC) corresponding to a core network of LTE. The gNB 200 (or the LTE base stations) may be connected to the 5GC 20. The base station of LTE and the gNB 200 may be connected to each other via the inter-base station interface.

The 5GC 20 includes an Access and Mobility Management Function (AMF) 301 (301-1, 301-2) and a User Plane Function (UPF) 302 (302-1, 302-2). The AMF 301 performs various types of mobility controls and the like for the UE 100. The AMF 301 communicates with the UE 100 by using Non-Access Stratum (NAS) signaling, and thereby manages information of an area in which the UE 100 exists. The UPF 302 controls data transfer. The AMF 301 and the UPF 302 are connected to the gNB 200 via an NG interface which is an interface between the base station and the core network. The AMF 301 and the UPF 302 are examples of core network apparatuses connected to the 5GC (core network) 20.

Figure 2:
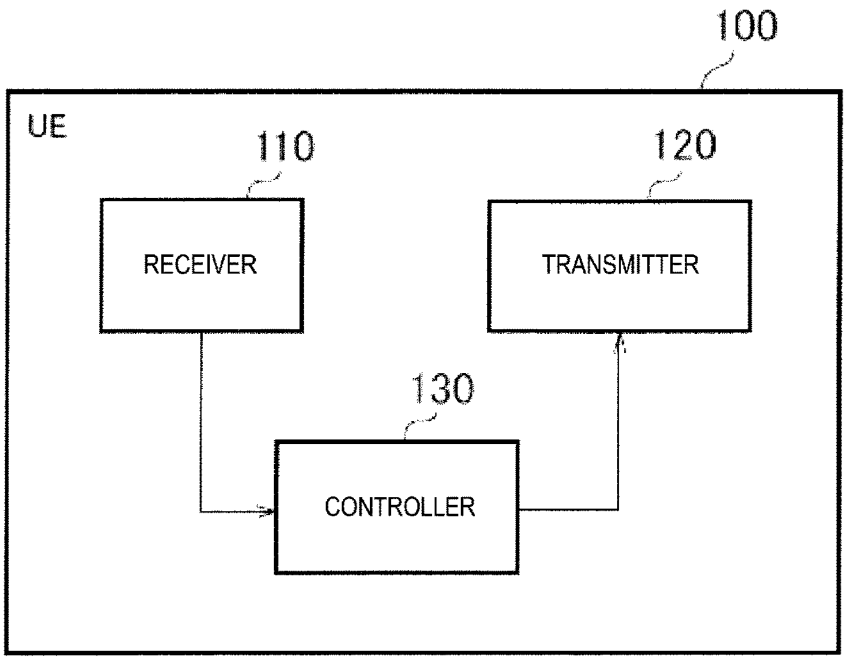
FIG. 2 is a diagram illustrating a configuration example of a user equipment (UE) according to an embodiment.

FIG. 2 is a diagram illustrating a configuration example of the UE 100 (user equipment) according to an embodiment.

As illustrated in FIG. 2, the UE 100 includes a receiver 110, a transmitter 120, and a controller 130.

The receiver 110 performs various types of reception under control of the controller 130. The receiver 110 includes an antenna and a reception device. The reception device converts (down-converts) a radio signal received through the antenna into a baseband signal (a received signal) and outputs the resulting signal to the controller 130.

The transmitter 120 performs various types of transmission under control of the controller 130. The transmitter 120 includes an antenna and a transmission device. The transmission device converts (up-converts) a baseband signal output by the controller 130 (a transmission signal) into a radio signal and transmits the resulting signal through the antenna.

The controller 130 performs various types of control in the UE 100. The controller 130 includes at least one processor and at least one memory electrically connected to the processor. The memory stores a program to be executed by the processor and information to be used for processing by the processor. The processor may include a baseband processor and a Central Processing Unit (CPU). The baseband processor performs modulation and demodulation, coding and decoding, and the like of a baseband signal. The CPU executes the program stored in the memory to thereby perform various types of processing. The controller 130 may perform various types of operation and various types of processing performed by the UE 100 in each embodiment described below.

Figure 3:
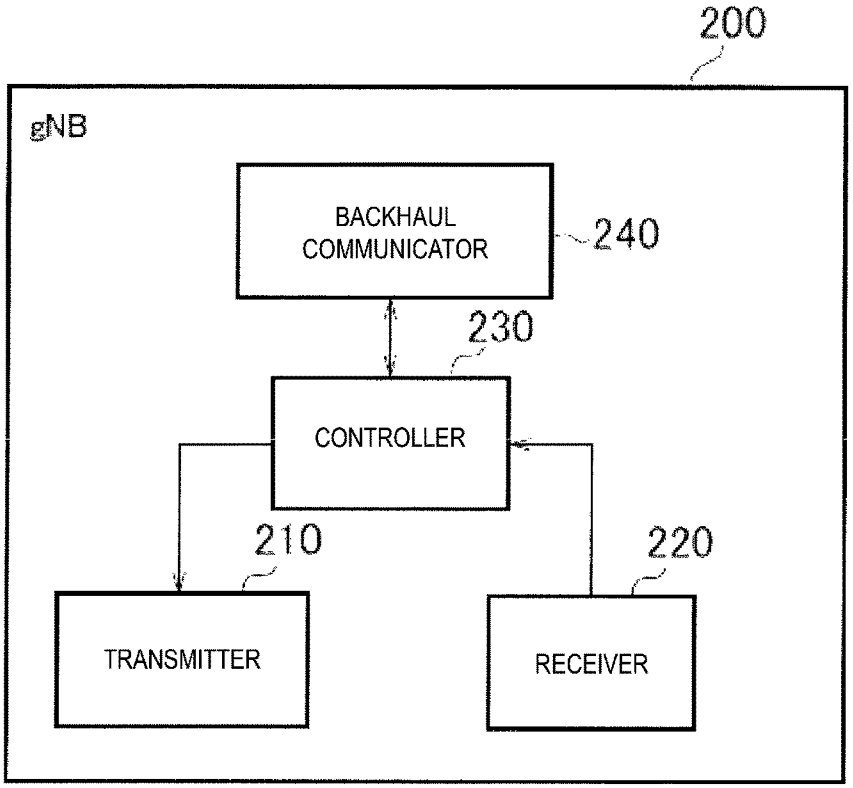
FIG. 3 is a diagram illustrating a configuration example of a gNB (base station) according to an embodiment.

FIG. 3 is a diagram illustrating a configuration example of the gNB 200 (base station) according to an embodiment.

As illustrated in FIG. 3, the gNB 200 includes a transmitter 210, a receiver 220, a controller 230, and a backhaul communicator 240.

The transmitter 210 performs various types of transmission under control of the controller 230. The transmitter 210 includes an antenna and a transmission device. The transmission device converts (up-converts) a baseband signal output by the controller 230 (a transmission signal) into a radio signal and transmits the resulting signal through the antenna.

The receiver 220 performs various types of reception under control of the controller 230. The receiver 220 includes an antenna and a reception device. The reception device converts (down-converts) a radio signal received through the antenna into a baseband signal (a received signal) and outputs the resulting signal to the controller 230.

The controller 230 performs various types of controls for the gNB 200. The controller 230 includes at least one processor and at least one memory electrically connected to the processor. The memory stores a program to be executed by the processor and information to be used for processing by the processor. The processor may include a baseband processor and a CPU. The baseband processor performs modulation and demodulation, coding and decoding, and the like of a baseband signal. The CPU executes the program stored in the memory to thereby perform various types of processing. The controller 230 may perform various types of operation and various types of processing performed by the gNB 200 in each embodiment described below.

The backhaul communicator 240 is connected to a neighboring base station via the inter-base station interface. The backhaul communicator 240 is connected to the AMF 301 and/or the UPF 302 via the interface between the base station and the core network. Note that the gNB may include a Central Unit (CU) and a Distributed Unit (DU), and these two units may be connected via an F1 interface.

Figure 4:
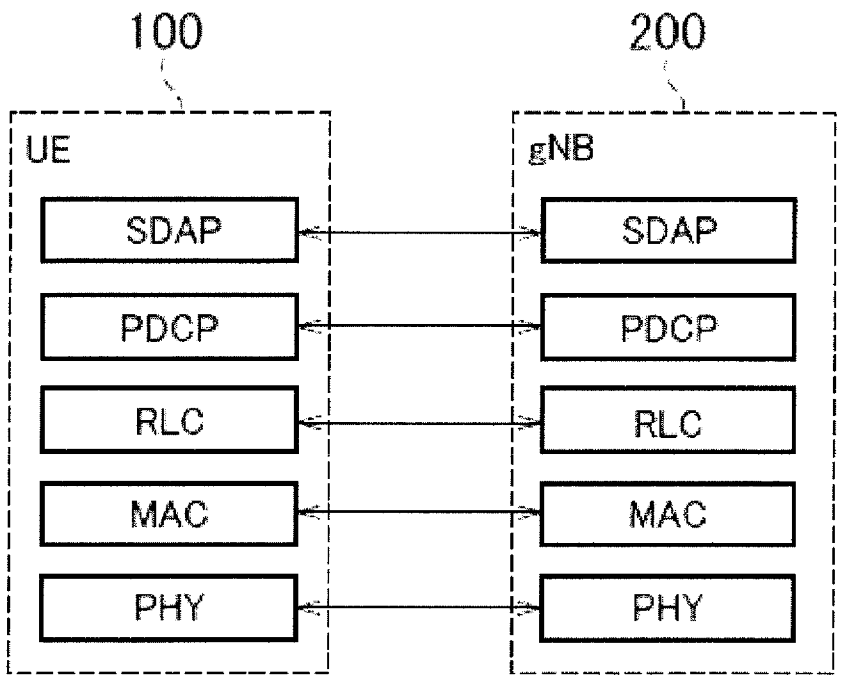
FIG. 4 is a diagram illustrating a configuration example of a protocol stack for a user plane according to an embodiment.

FIG. 4 is a diagram illustrating a configuration example of a protocol stack for a radio interface of a user plane according to an embodiment.

As illustrated in FIG. 4, a radio interface protocol of the user plane handling data includes a physical (PHY) layer, a Medium Access Control (MAC) layer, a Radio Link Control (RLC) layer, a Packet Data Convergence Protocol (PDCP) layer, and a Service Data Adaptation Protocol (SDAP) layer.

The PHY layer performs coding and decoding, modulation and demodulation, antenna mapping and demapping, and resource mapping and demapping. Data and control information are transmitted between the PHY layer of the UE 100 and the PHY layer of the gNB 200 via a physical channel.

The MAC layer performs priority control of data, retransmission processing through hybrid ARQ (HARQ: Hybrid Automatic Repeat reQuest), a random access procedure, and the like. Data and control information are transmitted between the MAC layer of the UE 100 and the MAC layer of the gNB 200 via a transport channel. The MAC layer of the gNB 200 includes a scheduler. The scheduler determines transport formats (transport block sizes, Modulation and Coding Schemes (MCSs)) in the uplink and the downlink and resource blocks to be allocated to the UE 100.

The RLC layer transmits data to the RLC layer on the reception side by using functions of the MAC layer and the PHY layer. Data and control information are transmitted between the RLC layer of the UE 100 and the RLC layer of the gNB 200 via a logical channel.

The PDCP layer performs header compression and decompression, and encryption and decryption. Data and control information are transmitted between the PDCP layer of the UE 100 and the PDCP layer of the gNB 200 via a radio bearer.

The SDAP layer performs mapping between a QoS (Quality of Service) flow as the unit of QoS control performed by a core network and the radio bearer as the unit of QoS control performed by the Access Stratum (AS). Note that, when the RAN is connected to the EPC, the SDAP need not be provided.

Figure 5:
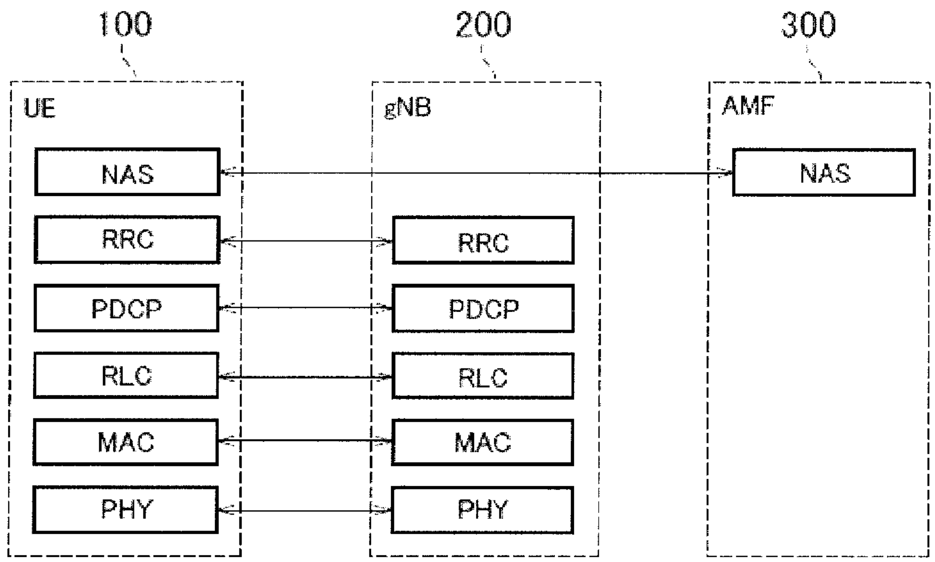
FIG. 5 is a diagram illustrating a configuration example of a protocol stack for a control plane according to an embodiment.

FIG. 5 is a diagram illustrating a configuration example of a protocol stack for a radio interface of a control plane according to an embodiment.

As illustrated in FIG. 5, the protocol stack for the radio interface of the control plane handling signaling (control signal) includes a Radio Resource Control (RRC) layer and a NAS layer instead of the SDAP layer illustrated in FIG. 4.

RRC signaling for various configurations is transmitted between the RRC layer of the UE 100 and the RRC layer of the gNB 200. The RRC layer controls a logical channel, a transport channel, and a physical channel according to establishment, re-establishment, and release of a radio bearer. When a connection between the RRC of the UE 100 and the RRC of the gNB 200 (RRC connection) exists, the UE 100 is in an RRC connected state. When a connection between the RRC of the UE 100 and the RRC of the gNB 200 (RRC connection) does not exist, the UE 100 is in an RRC idle state. When the RRC connection is suspended, the UE 100 is in an RRC inactive state.

The Non-Access Stratum (NAS) layer which is positioned upper than the RRC layer performs session management, mobility management, and the like. NAS signaling is transmitted between the NAS layer of the UE 100 and the NAS layer of the AMF 301.

Note that the UE 100 includes an application layer other than the protocol of the radio interface.

First Embodiment

A first embodiment will be described.

Figure 6:
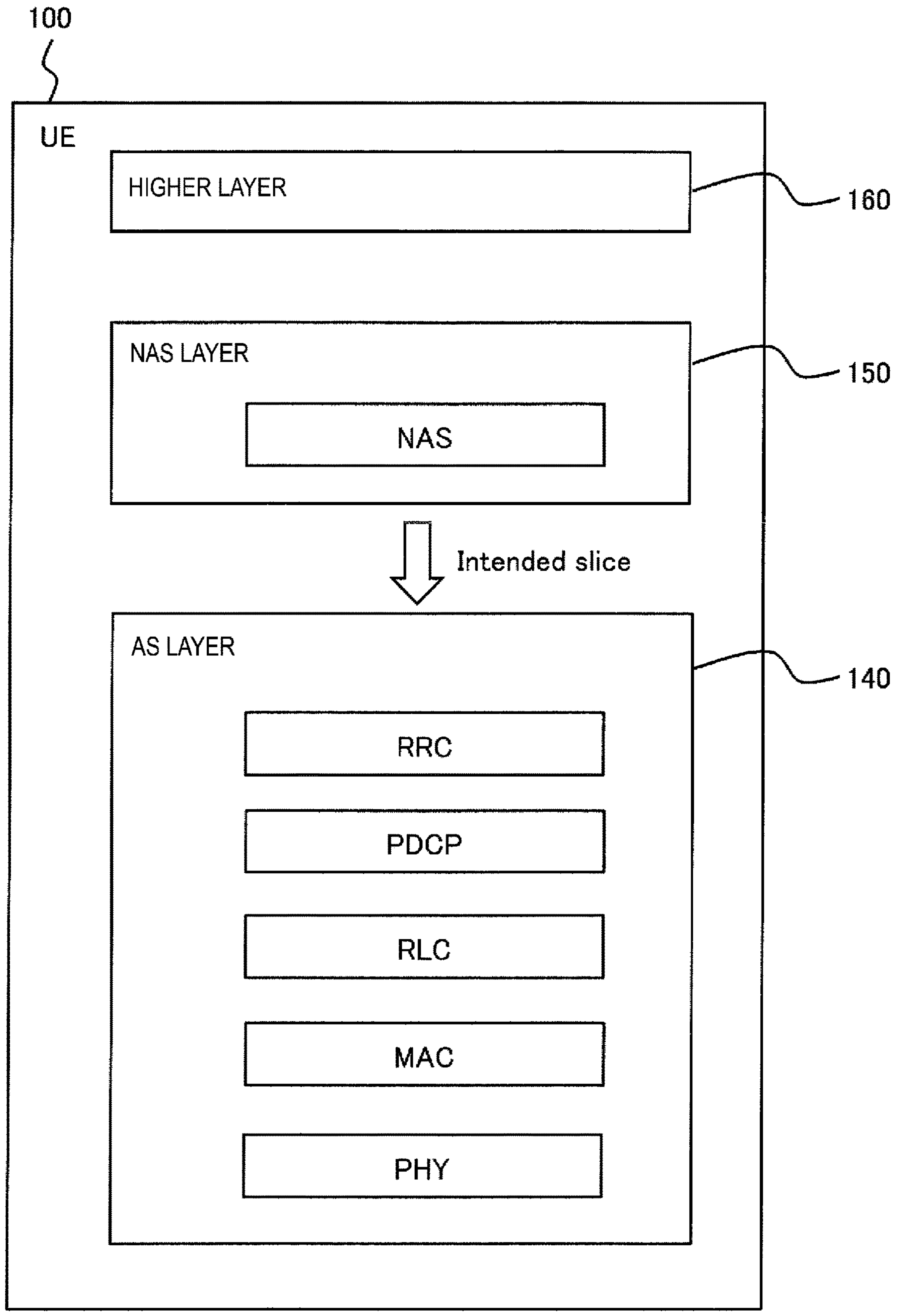
FIG. 6 is a diagram illustrating a relationship example of respective layers according to a first embodiment.

FIG. 6 is a diagram illustrating a relationship example of each layer according to the first embodiment. As illustrated in FIG. 6, the UE 100 includes an AS layer 140, a NAS layer 150, and a higher layer 160.

The AS layer 140 includes the layers of the control plane of the radio interface illustrated in FIG. 5. In other words, the AS layer 140 includes a PHY layer, a MAC layer, an RLC layer, a PDCP layer, and an RRC layer.

In the example illustrated in FIG. 6, the higher layer 160 is present as a higher layer of the NAS layer 150. The higher layer 160 may include an application layer, for example.

Slice information related to network slicing of a cell in which the UE 100 exists is handled in the NAS layer 150. On the other hand, information related to the cell is handled in the AS layer 140. When the AS layer 140 of the UE 100 receives the slice information, the AS layer 140 notifies the NAS layer 150 of the received slice information. This allows the NAS layer 150 to grasp the slice information. Such processing may be performed, for example, in the controller 130.

Note that, hereinafter, network slicing may be referred to as "slice". In network slicing, a part supported by the NG-RAN 10 may be referred to as RAN slicing. Even when network slicing and RAN slicing are not distinguished from each other, they may be simply referred to as "slice" hereinafter.

Note that a slice indicates a logically divided core network and/or radio access network. An identifier for identifying a slice is NSSAI, S-NSSAI, or the like.

A slice group is a group including one or more slices, and an identifier (ID) is assigned to the group. The slice group may be created in a core network (e.g., AMF 301) or in a radio access network (e.g., gNB 200). The UE 100 may be notified of the created slice group.

In 3GPP, slice-specific cell reselection is under study. In the slice-specific cell reselection, a frequency is mapped to (or associated with) each slice, and a priority (absolute priority) is configured for each frequency. Performing cell reselection using the configuration is referred to as slice-specific cell reselection. The slice-specific cell reselection enables, for example, a frequency resource to be provided for each slice (or each slice group), and a situation to be suppressed in which the frequency resource overlaps between slices. Controlling the frequency priority for the cell which the UE 100 camps on (or reselects) for each slice (or each slice group) enables the UE 100 to exist (distribute/disperse) at appropriate frequency for each slice which the UE 100 desires to access. The UE 100 is also enabled to camp on (exist) at a frequency (or in a cell) different from a frequency of a UE that does not desire to access a slice (e.g., a legacy UE).

For the slice-specific cell reselection, 3GPP agreed that:

1) a prioritized frequency mapped to each slice is provided to the UE 100,
2) a "slice" may mean a "slice group",
3) the prioritized frequency mapped to each slice is a part of "Slice info", and the like.

In 3GPP, slice-specific random access channel(s) (RACH (s)) are under study. A random access procedure performed using a separated random access occasion (RACH Occasion (RO) and/or a separated preamble for each slice or each slice group is referred to as a slice-specific random access channel (hereinafter, may be referred to as "slice-specific RACH"). The slice-specific RACH enables, for example, a resource for the RACH to be provided for each slice or each slice group, and a situation to be suppressed in which the resource overlaps between slices, between slice groups, or between access using a slice and access not using a slice. Avoiding the resource from overlapping enables suppressing interference of RACHs transmitted by a plurality of UE 100. An access to a certain slice or slice group can be controlled to be prioritized (by allocating a resource in which interference is less likely to occur).

Furthermore, in 3GPP, "intended slice" is also under study. However, 3GPP has not reached an agreement on the definition of concrete matters such as "intended slice". In the first embodiment, a slice that is likely to be used, a candidate slice, a desired slice, a slice with which communication is desired, a requested slice, an allowed slice, or an intended slice is referred to as an "intended slice". For example, when the NAS layer 150 notifies the AS layer 140 of the "intended slice", the AS layer 140 can perform various kinds of processing such as a cell reselection processing using the "intended slice".

However, the above-described slice-specific cell reselection and slice-specific RACH have the following problems. Specifically, both the slice-specific cell reselection and the slice-specific RACH are processes performed in the AS layer 140. However, the NAS layer 150 has no way to grasp whether the cell in which the UE 100 exists supports the slice-specific cell reselection (or the slice-specific RACH).

The above-described "intended slice" also has the following problem. Specifically, depending on a timing of notification from the NAS layer 150 to the AS layer 140, the AS layer 140 may not be able to perform processing related to the "intended slice" at an appropriate timing.

Therefore, in the first embodiment, when the AS layer 140 of the UE 100 in the RRC idle state or the RRC inactive state acquires a parameter for the slice-specific cell reselection or the slice-specific RACH, the AS layer 101 notifies the NAS layer 150 that the slice-specific cell reselection or the slice-specific RACH is available in the cell in which the UE 100 exists.

To be specific, first, a first layer (e.g., the AS layer 140) of a user equipment (e.g., the UE 100) in an RRC idle state or an RRC inactive state receives system information from a base station (e.g., the gNB 200). Second, the first layer of the user equipment notifies a second layer (e.g., the NAS layer 150) higher than the first layer of at least one of first information or second information based on the system information, the first information indicating whether slice-specific cell reselection is possible, the second information indicating whether slice-specific RACH is available.

This allows the NAS layer 150 to grasp whether the slice-specific cell reselection is possible in the cell in which the UE 100 exists. The NAS layer 150 can grasp whether the slice-specific RACH is available in the cell in which the UE 100 exists. Then, the NAS layer 150 can perform appropriate processing based on these pieces of information.

Note that hereinafter, a "slice identifier" may be described. In this case, the "slice identifier" may include the S-NSSAI, the NSSAI, or the slice group ID.

Operation Example According to First Embodiment

Figure 7:
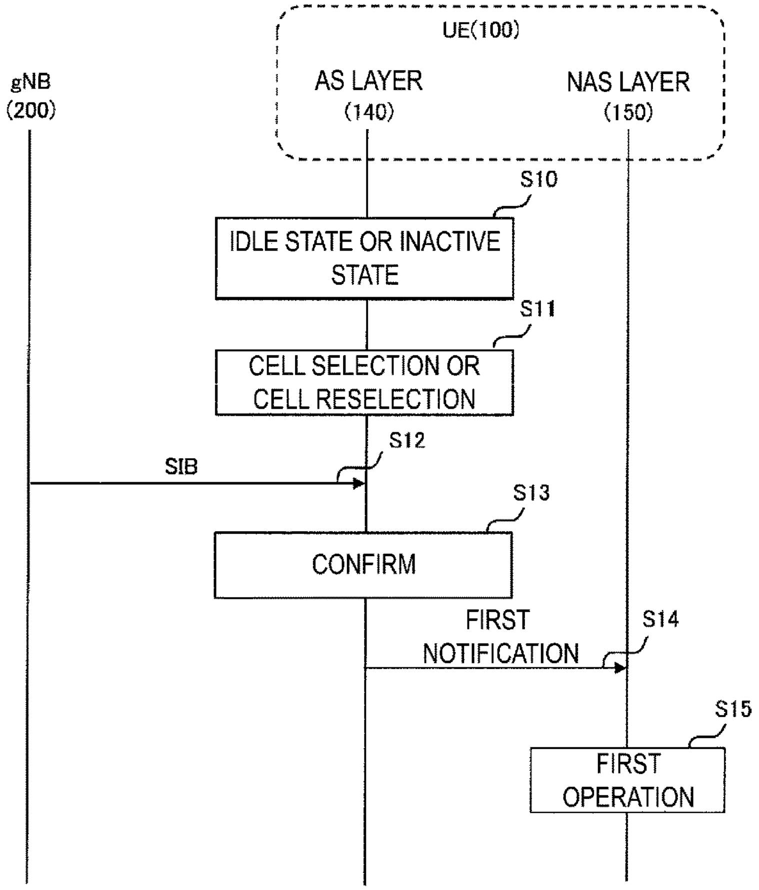
FIG. 7 is a sequence chart illustrating an operation example according to the first embodiment.

FIG. 7 is a sequence chart illustrating an operation example according to the first embodiment.

As illustrated in FIG. 7, in step S10, the UE 100 is in the RRC idle state (hereinafter, also referred to as the "idle state" in some cases) or the RRC inactive state (hereinafter, also referred to as the "inactive state" in some cases).

In step S11, the AS layer 140 of the UE 100 performs cell selection or cell reselection. Here, the cell reselection may be slice-specific cell reselection. The cell reselection may be normal (conventional) cell reselection rather than the slice-specific cell reselection.

In the case of the slice-specific cell reselection, the AS layer 140 may select a cell using the prioritized frequency associated with each slice.

For normal cell selection or cell reselection, a suitable cell may be selected based on cell selection criteria, and a better cell may be selected according to cell reselection criteria when camping on a cell.

Figure 8:
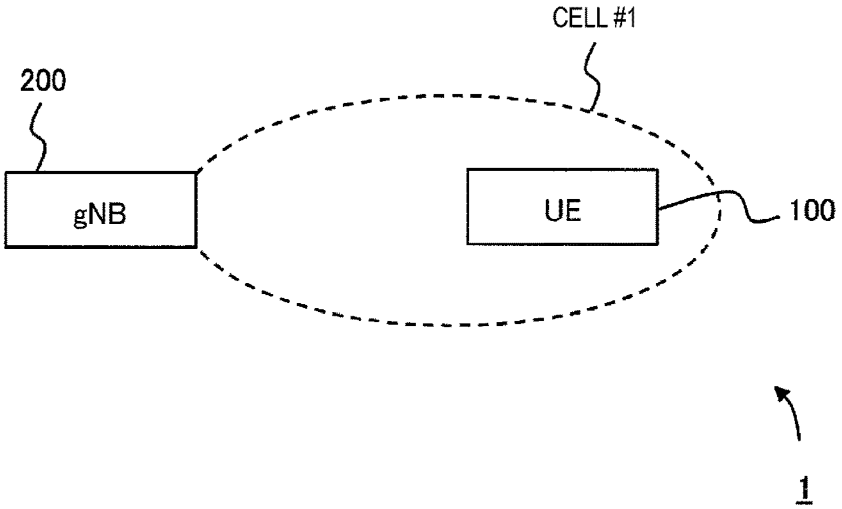
FIG. 8 is a diagram illustrating a configuration example of a mobile communication system 1 according to the first embodiment.

FIG. 8 is a diagram illustrating a configuration example of the mobile communication system 1 according to the first embodiment. FIG. 8 illustrates an example in which the UE 100 in the idle state or the inactive state selects a cell #1 through the cell selection or the cell reselection.

Returning to FIG. 7, in step S12, the AS layer 140 receives a System Information Block (SIB: system information) broadcast from the selected cell. Note that step S12 may be performed not when the AS layer 140 selects the cell but when receiving an updated SIB.

In step S13, the AS layer 140 confirms whether the received SIB includes a parameter for the slice-specific cell reselection (hereinafter, also referred to as a "slice-specific cell reselection parameter" in some cases). In step S13, the AS layer 140 confirms whether the received SIB includes a parameter for the slice-specific RACH (hereinafter, also referred to as a "slice-specific RACH parameter" in some cases).

In step S14, the AS layer 140 notifies the NAS layer 150 of a first notification corresponding to the confirmation result.

First, the AS layer 140, when confirming that the SIB includes the slice-specific cell reselection parameter, notifies the NAS layer 150 of the first notification including information indicating that the slice-specific cell reselection is possible in the cell in which the UE 100 exists. The first notification may include a slice identifier to which the slice-specific cell reselection parameter is provided. In other words, when the slice identifier and the slice-specific cell reselection parameter associated with the slice identifier are provided in the SIB, the AS layer 140 may notify the NAS layer 150 of the first notification including the slice identifier. One or more slice identifiers (e.g., in a list format) may be included in the first notification.

Note that when the AS layer 140 receives the provision of the "intended slice" from the NAS layer 150 and confirms that the SIB includes the slice-specific cell reselection parameter for the "intended slice, the AS layer 140 notifies of the first notification including information indicating that the slice-specific cell reselection of the "intended slice" is possible. The AS layer 140 can confirm whether the SIB includes the slice-specific cell reselection parameter for the "intended slice", based on, for example, the slice identifier of the "intended slice" and the slice identifier associated with the slice-specific cell reselection parameter included in the SIB.

Second, the AS layer 140, when confirming that the SIB includes the slice-specific RACH parameter, notifies the first notification including information indicating that the slice-specific RACH is available in the cell in which the UE 100 exists. The first notification may include a slice identifier to which the slice-specific RACH parameter is provided. In other words, when the slice identifier and the slice-specific RACH parameter associated with the slice identifier are provided in the SIB, the AS layer 140 may notify the NAS layer 150 of the first notification including the slice identifier. One or more slice identifiers (e.g., in a list format) may be included in the first notification.

In this case also when the AS layer 140 receives the provision of the "intended slice" from the NAS layer 150 and confirms that the SIB includes the slice-specific RACH parameter for the "intended slice", the AS layer 140 notifies the first notification including information indicating that the slice-specific RACH of the "intended slice" is possible. The AS layer 140 can confirm whether the SIB includes the slice-specific RACH parameter for the "intended slice" based on, for example, the slice identifier of the "intended slice" and the slice identifier associated with the slice-specific RACH parameter included in the SIB.

Third, the AS layer 140, when confirming that the slice-specific cell reselection parameter is not included in the SIB, notifies the NAS layer 150 of the first notification including information indicating that the slice-specific cell reselection is not possible in the cell in which the UE 100 exists. The first notification may include a slice identifier to which the slice-specific cell reselection parameter is not provided. In other words, when the slice identifier and the slice-specific cell reselection parameter associated with the slice identifier are not provided in the SIB, the AS layer 140 may notify the NAS layer 150 of the first notification including the slice identifier. One or more slice identifiers (e.g., in a list format) may be included in the first notification.

Note that when the AS layer 140 receives the provision of the "intended slice" from the NAS layer 150 and confirms that the slice-specific cell reselection parameter for the "intended slice" is not included in the SIB, the AS layer 140 notifies the first notification including information indicating that the slice-specific cell reselection of the "intended slice" is not possible.

Fourth, the AS layer 140, when confirming that the slice-specific RACH parameter is not included in the SIB, notifies the first notification including information indicating that the slice-specific RACH is not possible in the cell in which the UE 100 exists. The first notification may include a slice identifier to which the slice-specific RACH parameter is not provided. In other words, when the slice identifier and the slice-specific RACH parameter associated with the slice identifier are not provided in the SIB, the AS layer 140 may notify the NAS layer 150 of the first notification including the slice identifier. One or more slice identifiers (e.g., in a list format) may be included in the first notification.

In this case also when the AS layer 140 receives the provision of the "intended slice" from the NAS layer 150 and confirms that the slice-specific RACH parameter for the "intended slice" is not included in the SIB, the AS layer 140 notifies the first notification including information indicating that the slice-specific RACH of the "intended slice" is not possible.

Note that the first notification in step S14 may be transmitted when a status of the slice-specific cell reselection is changed from "possible" to "not possible" (or vice versa). Alternatively, the first notification in step S14 may be transmitted when a status of the slice-specific RACH changes from "possible" to "not possible" (or vice versa).

The AS layer 140 may appropriately combine the four cases described above. For example, when the AS layer 140 confirms that the SIB includes the two parameters of the slice-specific cell reselection parameter and the slice-specific RACH parameter, the AS layer 140 may notify the first notification including information indicating that the slice-specific cell reselection and the slice-specific RACH are possible.

When a slice identifier is associated with each parameter, the AS layer 140 may notify the NAS layer 150 of the first notification per slice identifier. For example, assume that S-NSSAIs #1 to #4 exist. Assume also that the UE 100 moves from a first cell to a second cell through the cell selection or the cell reselection (in step S11). Furthermore, assume that a parameter associated with each of the S-NSSAIs #1 to #4 (which may be referred to as a "parameter" when the slice-specific cell reselection parameter and the slice-specific RACH parameter are not distinguished from each other) is present or absent depending on the cell due to the movement. For example, regarding the S-NSSAI #1, a parameter associated with this slice identifier is present in a certain cell, but is absent in another cell. This is because, depending on the cell, the slice-specific cell reselection (or slice-specific RACH) may or may not be supported even with the same slice identifier.

Specifically, the AS layer 140 notifies the NAS layer 150 of the first notification as below.

S-NSSAI #1

Regarding the S-NSSAI #1, assume that a parameter associated with the S-NSSAI #1 is absent in the first cell before the movement, but a parameter associated with the S-NSSAI #1 is present in the second cell after the movement. In this case, the AS layer 140, when confirming that the SIB includes the slice-specific cell reselection parameter in the second cell, notifies the NAS layer 150 of information indicating that the slice-specific cell reselection is supported in the second cell. The AS layer 140, when confirming that the SIB includes the slice-specific RACH parameter, notifies the NAS layer 150 of information indicating that the slice-specific RACH is supported in the second cell. The AS layer 140, when confirming two parameters for both, notifies information indicating that both are supported.

S-NSSAI #2

Regarding the S-NSSAI #2, assume that a parameter associated with the S-NSSAI #2 is present in the first cell before the movement, but a parameter associated with the S-NSSAI #2 is absent in the second cell after the movement. In this case, the AS layer 140, when confirming that the slice-specific cell reselection parameter is not included in the SIB in the second cell, notifies the NAS layer 150 of information indicating that the slice-specific cell reselection is not supported in the second cell. The AS layer 140, when confirming that the slice-specific RACH parameter is not included in the SIB, notifies the NAS layer 150 of information indicating that the slice-specific RACH is not supported in the second cell.

S-NSSAI #3

Regarding the S-NSSAI #3, assume that a parameter associated with the S-NSSAI #3 is absent in the first cell, and a parameter associated with the S-NSSAI #3 is absent also in the second cell. In this case, the AS layer 140, when confirming that the slice-specific cell reselection parameter is not included in the SIB in the second cell, notifies the NAS layer 150 of information indicating that the slice-specific cell reselection is not supported in the second cell. The AS layer 140, when confirming that the slice-specific RACH parameter is not included in the SIB, notifies the NAS layer 150 of information indicating that the slice-specific RACH is not supported in the second cell. In this case, the AS layer 140 may not notify the first notification because there is no change in the presence or absence of the parameter before and after the movement of the cell.

S-NSSAI #4

Regarding the S-NSSAI #4, assume that a parameter associated with the S-NSSAI #4 is present in the first cell, and a parameter associated with the S-NSSAI #4 is present also in the second cell. In this case, the AS layer 140, when confirming that the SIB includes the slice-specific cell reselection parameter in the second cell, notifies the NAS layer 150 of information indicating that the slice-specific cell reselection is supported in the second cell. The AS layer 140, when confirming that the SIB includes the slice-specific RACH parameter, notifies the NAS layer 150 of information indicating that the slice-specific RACH is supported in the second cell. In this case also, the AS layer 140 may not notify the first notification because there is no change in the presence or absence of the parameter before and after the movement of the cell.

The first notification described above may be a notification as below that is not related to the slice-specific cell reselection and the slice-specific RACH.

(A1) The first notification including information indicating that the cell in which the UE 100 exists supports or does not support network slicing.

(A2) The first notification including information indicating that the cell in which the UE 100 exists supports or does not support RAN slicing.

(A3) The first notification including information indicating that the cell in which the UE 100 exists supports or does not support a slice having a specific slice identifier.

(A4) The first notification including information indicating that the cell in which the UE 100 exists supports or does not support priority access to a slice having a specific slice identifier. For example, the AS layer 140, when acquiring a slice-specific RACH parameter associated with a specific slice identifier, can access a cell having the slice through an RACH procedure. Therefore, the AS layer 140 can confirm whether the priority access to the slice is supported based on whether the slice-specific RACH parameter is acquired from the SIB.

The above description is for the operation in step S14.

In step S15, the NAS layer 150 performs a predetermined operation. A specific example of the predetermined operation will be described in a second embodiment.

Thereafter, the UE 100 may perform the cell selection or the cell reselection (step S11) and repeat the above-described processing.

Variation of First Embodiment

In the first embodiment, the slice-specific cell reselection is described. For example, as a variation of the first embodiment, slice-specific cell selection may be used instead of the slice-specific cell reselection. In the slice-specific cell selection, for example, a frequency is associated with each slice, and the frequency is prioritized. The UE 100, when performing the slice-specific cell selection, may use the configuration to perform the cell selection.

In the first embodiment, the example has been described in which the UE 100 acquires the parameters from the SIB. For example, as a variation of the first embodiment, the UE 100 may acquire the parameters through dedicated signaling such as an RRC release message or an RRC reconfiguration message, instead of the SIB.

Furthermore, in the first embodiment, the example has been described in which the UE 100 acquires the parameters for the selected cell from that cell. For example, as a variation of the first embodiment, the UE 100 may receive the SIB broadcast from an adjacent cell adjacent to the selected cell (or the serving cell) and acquire parameters for the adjacent cell from the received SIB. Then, the AS layer 140 in the UE 100 may notify the NAS layer 150 of the first notification including the information indicating whether the slice-specific cell reselection and/or the slice-specific RACH is supported in the adjacent cell depending on whether the parameters are acquired. Alternatively, the UE 100 may receive adjacent cell information broadcast from the serving cell, and acquire information indicating whether the slice-specific cell reselection and/or the slice-specific RACH is supported in the adjacent cell based on the adjacent cell information.

Further, in the first embodiment, the example has been described in which the UE 100 is in the idle state or the inactive state. For example, the UE 100 may be in the connected state. The UE 100 in the connected state can receive the SIB broadcast from the base station 200 and perform the processing described in the first embodiment.

Second Embodiment

A second embodiment is described.

In the second embodiment, a specific example of the predetermined operation in the first embodiment is described.

To be more specific, the second layer (e.g., the NAS layer 150) of the user equipment (e.g., UE 100) performs the predetermined operation based on at least one of the first information (e.g., information indicating whether the slice-specific cell reselection is supported in the cell in which the UE 100 exists) or the second information (e.g., information indicating whether the slice-specific RACH is supported in the cell in which the UE 100 exists).

Operation Example According to Second Embodiment

Figure 9:
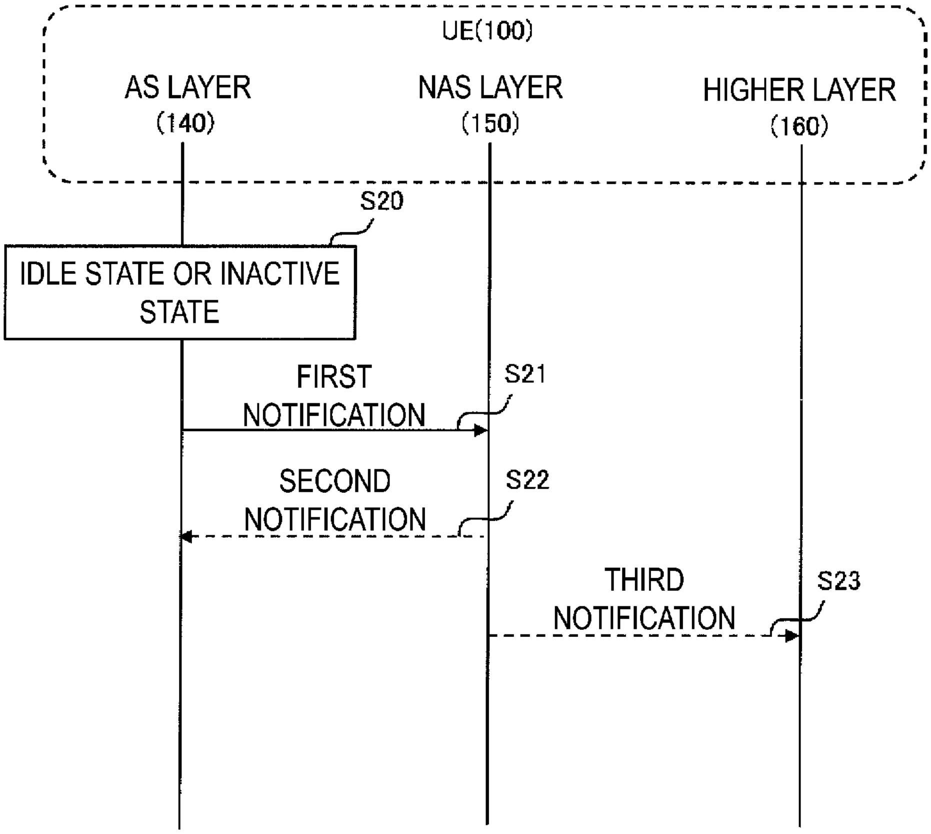
FIG. 9 is a sequence chart illustrating an operation example according to a second embodiment.

FIG. 9 is a sequence chart illustrating an operation example according to the second embodiment.

In FIG. 9, step S20 and step S21 are the same as step S10 and step S14 in the first embodiment, respectively.

In step S22, the NAS layer 150 may notify the AS layer 140 of a second notification. In step S23, the NAS layer 150 may notify the higher layer 160 of a third notification. The order of step S22 and step S23 may be inverted.

As described above, the predetermined operation includes the second notification that the NAS layer 150 notifies to the AS layer 140 and the third notification that the NAS layer 150 notifies to the higher layer 160. Hereinafter, two cases are described.

Second Notification

The NAS layer 150 may (again) notify the AS layer 140 of the "intended slice" as the second notification. For example, consider a case where the NAS layer 150 receives, as the first notification, information indicating that priority access to a specific slice is supported (e.g., (A4) in the first embodiment) and the specific slice is an "intended slice". In such a case, the NAS layer 150 may notify the "intended slice" again as the second notification in order to notify that the priority-accessible specific slice is the "intended slice".

The NAS layer 150 may notify a slice priority as the second notification. For example, consider a case where the NAS layer 150 receives, as the first notification, information indicating that the slice-specific cell reselection is possible for a plurality of slices. In such a case, the NAS layer 150 may notify the second notification including information indicating the slice identifier and the priority for each of the plurality of slices.

Furthermore, the NAS layer 150 may notify the second notification including a request (start) for RRC connection establishment by the priority access. For example, consider a case where the NAS layer 150 receives information indicating that the slice-specific RACH is available. In this case, the AS layer 140 can access the corresponding cell using the slice-specific RACH parameter. Therefore, the NAS layer 150 may request the AS layer 140 to establish an RRC connection by the priority access using the slice-specific RACH.

Furthermore, the NAS layer 150 may notify the second notification including an indication of a Public Land Mobile Network (PLMN) search or a cell search. Such a second notification may be transmitted, for example, although the NAS layer 150 receives information indicating that the slice-specific cell reselection is possible in the cell in which the UE 100 exists, when the NAS layer 150 requests an access to a cell other than that cell.

Further, the NAS layer 150 may provide the second notification including information indicating a frequency priority associated with the slice. For example, when a URLLC slice is used, in order to prioritize the use of a specific frequency F1, the NAS layer 150 notifies the AS layer 140 of the priority of the frequency associated with the slice, and the like.

Furthermore, when a plurality of slice groups exist, the NAS layer 150 may notify the second notification including the priorities between the slice groups.

Furthermore, the NAS layer 150 may notify the second notification including a request for change of the Public land Mobile Network (PLMN) or a Standalone Non-Public Network (SNPN). For example, the NAS layer 150 may notify when grasping that the "intended slice" is present in a PLMN different from the serving PLMN. The AS layer 140, when receiving the second notification, may search for a PLMN different from the serving PLMN and notify the NAS layer 150 of the search result. The same applies to the case of SNPN.

Third Notification

The NAS layer 150 may notify an application that uses a certain slice of information, as the third notification, indicating that priority access to the slice is possible or not possible. The application, when receiving the notification, may perform the following processing, for example.

First, the application may display on a display device of the UE 100 that the priority access is possible or not possible.

Second, the application may perform processing according to whether the priority access is possible or the priority access is not possible. When the priority access is not possible, the application may transmit a dummy packet to the gNB 200 prior to data packet transmission to establish a connection with the gNB 200 (or cell). This allows the application to transmit the data packet without delay since the connection has already been established at the actual transmission stage of the data packet.

Variation of Second Embodiment

In the second embodiment, the example has been described in which the UE 100 is in the idle state or the inactive state. For example, the UE 100 may be in the connected state. The UE 100 in the connected state can receive the SIB broadcast from the base station 200 and perform the processing described in the second embodiment.

Third Embodiment

A third embodiment will be described.

In the third embodiment, the NAS layer 150 of the UE 100 transmits a desired RRC state to the gNB 200 via the AS layer 140.

Specifically, first, the first layer (e.g., the AS layer 140) of the user equipment (e.g., the UE 100) in the RRC connected state (hereinafter, also referred to as the "connected state" in some cases) with the base station (e.g., the gNB 200) notifies the second layer (e.g., the NAS layer 150) higher than the first layer of at least one of third information or fourth information, the third information indicating whether a parameter for the slice-specific cell reselection is acquired, the fourth information indicating whether a parameter for the slice-specific random access channel is acquired. Second, the second layer notifies the first layer of fifth information indicating whether to maintain the connected state or to shift to the idle state or the inactive state for the user equipment based on at least one of the third information or the fourth information. Third, the first layer transmits the fifth information to the base station.

This allows the NAS layer 150 to notify the gNB 200 of the RRC state desired by the NAS layer 150.

Operation Example According to Third Embodiment

Figure 10:
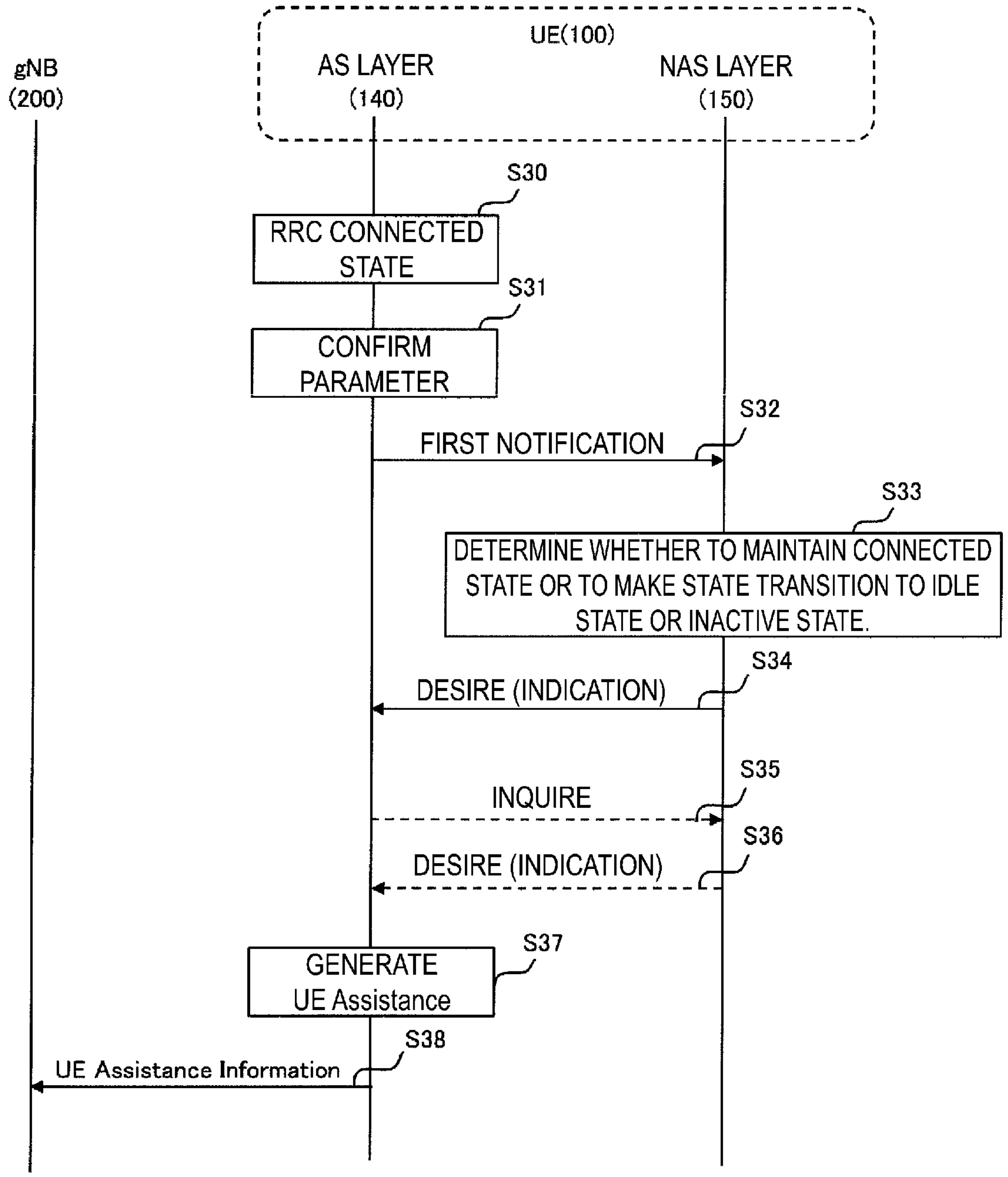
FIG. 10 is a sequence chart illustrating an operation example according to a third embodiment.

FIG. 10 is a sequence chart illustrating an operation example according to the third embodiment.

As illustrated in FIG. 10, in step S30, the UE 100 is in the RRC connected state with the gNB 200. The UE 100 performs communication with the gNB 200 using a certain slice. To be more specific, the AS layer 140 of the UE 100 establishes a Protocol Data Unit (PDU) session associated with the slice with the gNB 200 to perform data communication using the PDU session.

In step S31, the AS layer 140 of the UE 100 confirms whether the slice-specific cell reselection parameter and/or the slice-specific RACH parameter are provided by way of the SIB or dedicated signaling. The confirmation may be the same as, or similar to, that the first embodiment (step S13 in FIG. 7).

In step S32, the AS layer 140 notifies the NAS layer 150 of the first notification corresponding to the confirmation result. The first notification may also be the same as, or similar to, that in the first embodiment (step S14 in FIG. 7). When there is no data communication for a certain period of time, the AS layer 140 may notify the NAS layer 150 of the first notification.

In step S33, the NAS layer 150 of the UE 100 determines the desired RRC state in accordance with the first notification. To be more specific, the NAS layer 150 determines whether to maintain the connected state or to make a state transition to the idle state or the inactive state. For example, the NAS layer 150 may determine to maintain the connected state when the priority access is not possible for the cell in which the UE 100 exists (e.g., when the slice-specific RACH is not supported for the cell in which the UE 100 exists). This is because, when the AS layer 140 transitions to the idle or inactive state, time may be taken to access again. For example, the NAS layer 150 may transition to the idle or inactive state when the priority access is possible for the cell in which the UE 100 exists (e.g., when the slice-specific RACH is supported in the cell in which the UE 100 exists). Further, the NAS layer 150 may make the determination in response to a request from an application included in the higher layer 160. Further, the NAS layer 150 may make the determination in response to a Quality of Service (QoS) request. Note that step S33 may be a second operation instead of a first operation (step S15 in FIG. 7) of the first embodiment.

In step S34, the NAS layer 150 notifies the AS layer 140 of a desired RRC state (or an instruction of RRC state) based on a determination result in step S33. Alternatively, when there is no data communication for a certain period of time, the NAS layer 150 may notify the desire in response to an inquiry (or request) from the AS layer 140.

Note that the UE 100 may detect that there is no data communication for a certain period of time. First, when there is no data communication for a certain period of time, the NAS layer 150 may receive the first notification from the AS layer 140 (step S32), determine the RRC state (step S33), and notify the desire (or the instruction) (step S34). Second, when there is no data for a certain period of time, the AS layer 140, in step S35, may inquire of the NAS layer 150 whether transition of the RRC state (transition to the idle state or inactive state) is possible. In this case, in step S36, the NAS layer 150 may notify the desire (or the instruction) based on the determination result in response to the inquiry.

The UE 100 may make the inquiry in step S35 immediately before step S37. That is, the AS layer 140 may make the inquiry before transmitting a UE assistance information message (or before generating the message, or when generating the message). This is because the AS layer 140 may share information with the NAS layer 150 and then transmits the UE assistance information message. The AS layer 140 may notify the NAS layer 150 of information, included in the inquiry (or together with the inquiry), indicating whether the cell in which the UE 100 exists provides the slice-specific cell reselection parameter and/or the slice-specific RACH parameter. The NAS layer 150 may newly determine the transition of the RRC state in response to the reception of the inquiry. In step S36, the NAS layer 150 notifies the AS layer 140 of the desired RRC state.

In step S37, the AS layer 140 generates the UE assistance information message. At this time, the AS layer 140 generates the UE assistance information message including information in accordance with the desired (or the instruction) from the NAS layer 150.

To be more specific, the AS layer 140 sets an IE "ReleasePreference" of the UE assistance information message to the RRC state desired by the UE 100. That is, when the desire indicates that the connected state is to be maintained, the AS layer 140 sets "preferredRRC-State" to "connected". When the desire indicates transition to the idle state, the AS layer 140 sets "preferredRRC-State" to "idle". Further, when the desire indicates transition to the inactive state, the AS layer 140 sets "preferredRRC-State" to "inactive". Note that the AS layer 140 may transition to the idle state. When the AS layer 140 may transition to the inactive state, the AS layer 140 sets "preferredRRC-State" to "outOfConnected". Note that the transition to the idle state or the inactive state may be configured in accordance with a preference of the AS layer 140. In this case, the AS layer 140 may set "preferredRRC-State" to "connected" depending on the preference.

In step S38, the AS layer 140 transmits the generated UE assistance information to the gNB 200. This enables the gNB 200 to be notified of the RRC state of the UE 100 desired by the NAS layer 150.

Fourth Embodiment

A fourth embodiment will be described.

When the slice-specific cell reselection is complete, the UE 100 may be considered to have moved to the optimal cell (or frequency) supporting the "intended slice". In such a case, the AS layer 140 notifies the NAS layer 150 of the movement to the optimum cell, so that the NAS layer 150 can perform various processes. Conversely, the UE 100 may fail to perform the slice-specific cell reselection. The AS layer 140 notifying the NAS layer 150 of the failure allows the NAS layer 150 to perform various processes.

Therefore, in the fourth embodiment, when the AS layer 140 of the UE 100 in the idle state or the inactive state completes the slice-specific cell reselection, the AS layer 140 notifies the NAS layer 150 of a completion notification.

To be specific, first, the first layer (e.g., the AS layer 140) of the user equipment (e.g., the UE 100) in the RRC idle state or the RRC inactive state performs the slice-specific cell reselection. Second, the first layer, when completing the slice-specific cell reselection, notifies the second layer (e.g., the NAS layer 150) higher than the first layer of the completion notification.

Operation Example According to Fourth Embodiment

Figure 11:
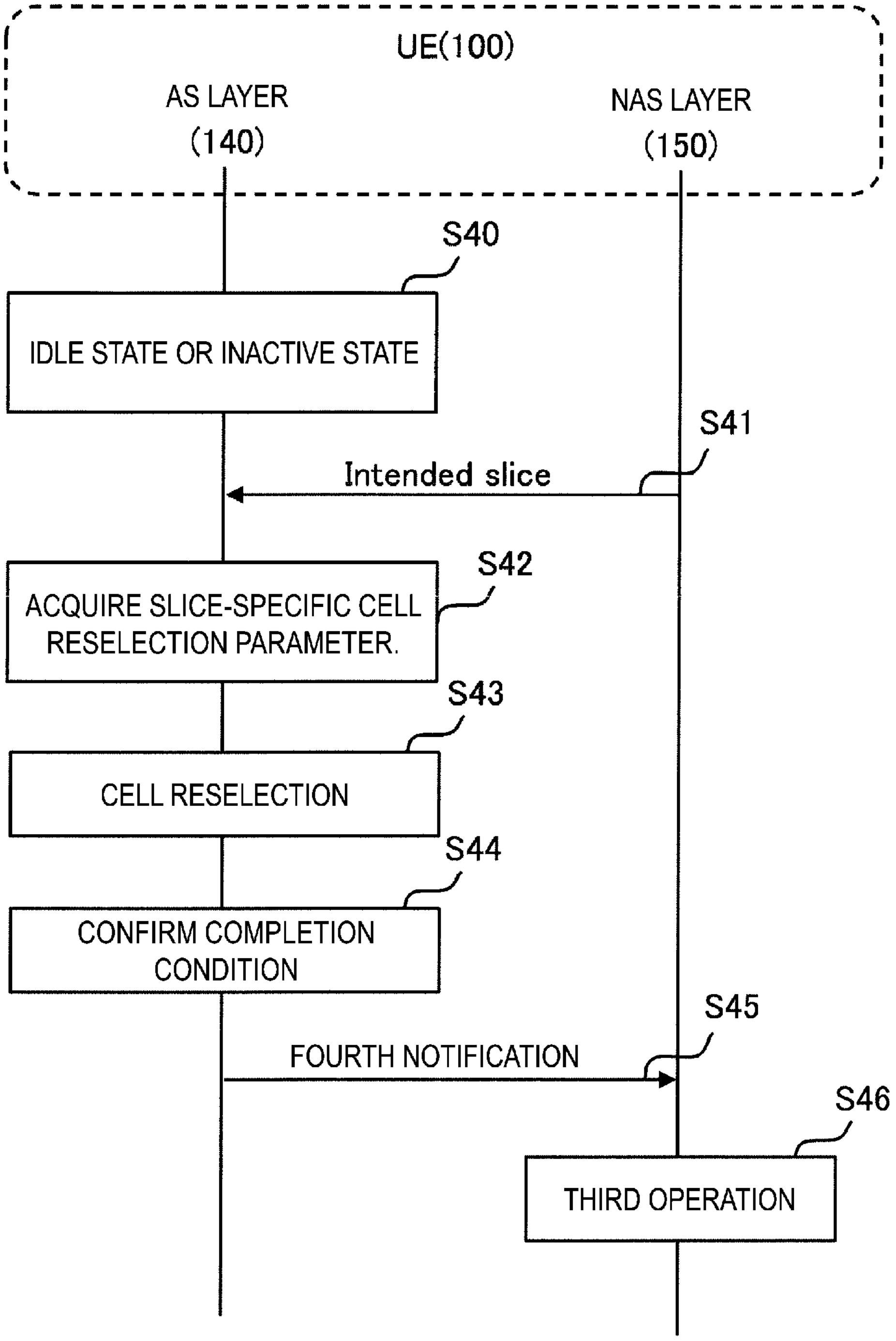
FIG. 11 is a sequence chart illustrating an operation example according to a fourth embodiment.

FIG. 11 is a sequence chart illustrating an operation example according to the fourth embodiment.

As illustrated in FIG. 11, in step S40, the UE 100 is in the idle state or the inactive state.

In step S41, the NAS layer 150 of the UE 100 notifies the AS layer 140 of the "intended slice".

In step S42, the AS layer 140 of UE 100 acquires the slice-specific cell reselection parameter from the cell before the cell reselection (e.g., the first cell). The AS layer 140 may acquire the parameter by way of the SIB or dedicated signaling.

In step S43, the AS layer 140 perform the slice-specific cell reselection using the slice-specific cell reselection parameter.

In step S44, the AS layer 140 confirms a completion condition for the slice-specific cell reselection. The completion condition for the slice-specific cell reselection is any one of the following three conditions.

(B1) When the slice-specific cell reselection processing is completed after the AS layer 140 applies the slice-specific cell reselection parameter (or in a state where the parameter is applied). In other words, when the AS layer 140 reselects a frequency (or cell) which is associated with a slice and prioritized.

(B2) When the AS layer 140 reselects the highest priority frequency (or cell) that is transmitted in the slice-specific cell reselection parameter. Instead of the "highest priority", a "high priority" frequency (or cell) may be used. In this case, the number of "high priority" frequencies among the prioritized frequencies may be configured by the gNB 200.

(B3) When a cell (or frequency) reselected by the AS layer 140 transmits the slice-specific RACH parameter corresponding to the slice identifier indicating the "intended slice". For example, when the UE 100 receives the slice-specific RACH parameter for the slice the UE 100 wants to use from the reselected cell.

Note that in (B1) to (B3) above, "reselecting a frequency" means, for example, that the AS layer 140 reselects a cell (e.g., a suitable cell) belonging to the frequency (e.g., the highest priority frequency) transmitted in the slice-specific cell reselection parameter. Further, "reselecting a cell" means that, for example, the AS layer 140 selects a suitable cell at a frequency (e.g., the highest priority frequency) transmitted in the slice-specific cell reselection parameter. In addition, "reselecting a cell" may means reselecting a cell transmitted in the slice-specific cell reselection parameter (e.g., a cell with the highest priority or a cell configured with a cell-specific offset value). The cell-specific offset value is an offset value to be added to a radio measurement value (Reference Signal Received Power (RSRP) or the like) when evaluating a suitable cell or a best ranked cell (e.g., "RSRP+ offset value (dB)"), and a different offset value is configured for each cell (or is not configured for each cell).

None of the completion conditions (B1) to (B3) is satisfied, the AS layer 140 may determine that the slice-specific cell reselection is failed. In this case, the AS layer 140 may perform normal cell reselection rather than the slice-specific cell reselection.

In step S45, the AS layer 140 notifies the NAS layer 150 of a fourth notification. Here, the fourth notification corresponds to two cases, specifically, when any one of the completion conditions (B1) to (B3) is satisfied and when none of the completion conditions is satisfied.

When Any One of Completion Conditions Is Satisfied

When any one of the completion conditions is satisfied (when the slice-specific cell reselection is successful), the AS layer 140 transmits the fourth notification including any one of the following pieces of information.

(C1) Completing the slice-specific cell reselection.

(C2) Existing in the cell supporting the slice ("intended slice").

(C3) Existing in the cell supporting the priority access for the slice ("intended slice"). For example, when the UE 100 exists in the cell transmitting the slice-specific RACH parameter.

When None of Completion Conditions Is Satisfied

When none of the completion conditions is satisfied, the AS layer 140 notifies the fourth notification including any one of the following pieces of information. When none of the completion conditions is satisfied corresponds to when the slice-specific cell reselection is failed and/or when the normal cell reselection is performed. When the normal cell reselection is performed includes when the normal cell reselection is successful or when the normal cell reselection is completed.

(D1) Failing the slice-specific cell reselection.

(D2) Existing in the cell not (or probably not) support the slice ("intended slice").

(D3) Existing in the cell not supporting the priority access for the slice ("intended slice"). For example, when the UE 100 exists in the cell not transmitting the slice-specific RACH parameter.

In step S46, the NAS layer 150 performs a third operation in response to the fourth notification. The third operation includes the following three, for example.

First, as the third operation, the NAS layer 150 may perform establishment or modification of a PDU session corresponding to the slice ("intended slice"). For example, when the URLLC slice is supported in the cell in which the UE 100 exists, the NAS layer 150 establishes a PDU session corresponding to the slice and starts communication for the URLLC slice. Alternatively, for example, the NAS layer 150 may include information related to the slice ("intended slice") in a requested S-NSSAI and transmit a PDU session request message or a PDU session modification message to the AMF 301. The NAS layer 150 may also transmit a handover request or a redirection request to the AMF 301.

Second, as the third operation, the NAS layer 150 may notify the application in the higher layer 160. For example, the NAS layer 150 may notify a URLLC application that communication is permitted or that communication is possible. Alternatively, for example, the NAS layer 150 may notify the user interface of the URLLC application to display that the UE 100 is within a communication service area, or may notify the URLLC application to start URLLC communication.

Third, the NAS layer 150 may perform request for (or indication of) the RRC connection establishment to the AS layer 140.

Variation of Fourth Embodiment

In the fourth embodiment, the case where the slice-specific cell reselection is completed is described. For example, instead of the slice-specific cell reselection, the slice-specific cell selection may be completed. Alternatively, PLMN selection for selecting a PLMN may be performed. Alternatively, Non Public Network (NPN) selection for selecting a non-public network such as a local 5G may be performed.

OTHER EMBODIMENTS

A program causing a computer to execute each of the processes performed by the UE 100 or the gNB 200 may be provided. The program may be recorded in a computer readable medium. Use of the computer readable medium enables the program to be installed on a computer. Here, the computer readable medium on which the program is recorded may be a non-transitory recording medium. The non-transitory recording medium is not particularly limited, and may be, for example, a recording medium such as a CD-ROM or a DVD-ROM.

Circuits for executing processing performed by the UE 100 or the gNB 200 may be integrated, and at least a part of the UE 100 or the gNB 200 may be implemented as a semiconductor integrated circuit (chipset, system on a chip (SoC)).

The phrases "based on" and "depending on" used in the present disclosure do not mean "based only on" and "only depending on," unless specifically stated otherwise. The phrase "based on" means both "based only on" and "based at least in part on". Similarly, the phrase "depending on" means both "only depending on" and "at least partially depending on". "Obtain" or "acquire" may mean to obtain information from stored information, may mean to obtain information from information received from another node, or may mean to obtain information by generating the information. The terms "include", "comprise" and variations thereof do not mean "include only items stated" but instead mean "may include only items stated" or "may include not only the items stated but also other items". The term "or" used in the present disclosure is not intended to be "exclusive or". Any references to elements using designations such as "first" and "second" as used in the present disclosure do not generally limit the quantity or order of those elements. These designations may be used herein as a convenient method of distinguishing between two or more elements. Thus, a reference to first and second elements does not mean that only two elements may be employed there or that the first element needs to precede the second element in some manner. For example, when the English articles such as "a," "an," and "the" are added in the present disclosure through translation, these articles include the plural unless clearly indicated otherwise in context.

Although embodiments have been described in detail with reference to the drawings, a specific configuration is not limited to those described above, and various design modifications and the like can be made without departing from the scope of the present disclosure. All of or a part of the embodiments can be combined together as long as no inconsistencies are introduced. For example, the PDU change operation in the NAS layer 150 and the handover request and the redirection request in the NAS layer 150 described in the fourth embodiment can also be performed in the second embodiment.

REFERENCE SIGNS

1: Mobile communication system
10: 5GC
100: UE
110: Receiver
130 Controller
140: AS layer
150: NAS layer
160: Higher layer
200: gNB
210: Transmitter
220: Receiver
230: Controller
301: AMF
302: UPF

The invention claimed is:

1. A communication control method used in a mobile communication system comprising a user equipment and a network node, and being capable of performing wireless communication between the user equipment and the network node, the communication control method comprising steps of:

notifying information relating to slice-specific cell reselection from a first layer of the user equipment to a second layer, of the user equipment, higher than the first layer; and performing, by the first layer of the user equipment in an RRC idle state or an RRC inactive state, slice-specific cell reselection; wherein the notifying to the second layer includes notifying, by the first layer, the second layer of a completion notification when the first layer completes the slice-specific cell reselection.

2. The communication control method according to claim 1, further comprising:

receiving, by the first layer of the user equipment in the RRC idle state or the RRC inactive state, system information from the network node; wherein the notifying to the second layer includes notifying, by the first layer of the user equipment, the second layer of at least one of first information indicating whether slice-specific cell reselection is available; and second information indicating whether a slice-specific random access channel is available, based on the system information.

3. The communication control method according to claim 2, wherein the slice-specific cell reselection uses a prioritized frequency mapped for per slice, and the slice-specific random access channel uses at least one of: a random access channel opportunity separated per slice group and a preamble separated per slice group.

4. The communication control method according to claim 2, wherein the first layer is an Access Stratum (AS) layer and the second layer is a Non Access Stratum (NAS) layer.

5. The communication control method according to claim 2, further comprising:

performing, by the second layer of the user equipment, a predetermined operation based on at least one of: the first information; and the second information.

6. The communication control method according to claim 2, wherein the first information includes a slice identifier having a slice-specific cell reselection parameter or a slice-specific RACH parameter.

7. The communication control method according to claim 2, wherein the second layer notifies information of an intended slice to the first layer.

8. The communication control method according to claim 2, wherein the information relating to slice-specific cell reselection includes one of: information indicating that the cell in which the user equipment exists supports or does not support network slicing; information indicating that the cell in which the user equipment exists supports or does not support RAN slicing; information indicating that the cell in which the user equipment exists supports or does not support a slice having a specific slice identifier; and information indicating that the cell in which the user equipment exists supports or does not support priority access to a slice having a specific slice identifier.

9. The communication control method according to claim 2, wherein the second layer notifies a slice priority to the first layer.

10. The communication control method according to claim 2, wherein the second layer notifies a request for RRC connection establishment by priority access to the first layer.

11. The communication control method according to claim 2, wherein the second layer notifies an indication of a Public Land Mobile Network (PLMN) search or a cell search to the first layer.

12. The communication control method according to claim 2, wherein the second layer notifies the first layer of priorities between slice groups when a plurality of slice groups exist.

13. The communication control method according to claim 1, further comprising:

notifying, by the second layer of the user equipment, the first layer of fifth information indicating whether to maintain the user equipment in the RRC connected state or to transition the user equipment to the RRC idle state or the RRC inactive state, based on at least one of: the third information; and the fourth information; and transmitting, by the first layer, the fifth information to the network node; wherein the notifying to the second layer includes notifying, by the first layer of the user equipment in an RRC connected state with the network node, the second layer of at least one of: third information indicating whether a parameter related to slice-specific cell reselection has been acquired; and fourth information indicating whether a parameter for slice-specific random access channel has been acquired.

14. The communication control method according to claim 13, wherein the transmitting comprises transmitting, by the first layer to the network node, a UE Assistance Information message comprising the fifth information.

15. The communication control method according to claim 1, wherein the completion notification comprises at least one selected from the group consisting of: completing the slice-specific cell reselection; existing in a cell supporting an intended slice; and existing in a cell supporting priority access for the intended slice.

16. A mobile communication system comprising:

a user equipment; and a network node performing wireless communication with the user equipment; wherein the user equipment comprising transceiver circuitry and processing circuitry operatively associated with the transceiver circuitry and configured to execute processes of:

notifying information relating to slice-specific cell reselection from a first layer of the user equipment to a second layer, of the user equipment, higher than the first layer; and performing, by the first layer of the user equipment in an RRC idle state or an RRC inactive state, slice-specific cell reselection; wherein the notifying to the second layer includes notifying, by the first layer, the second layer of a completion notification when the first layer completes the slice-specific cell reselection.

17. A user equipment comprising:

transceiver circuitry; and processing circuitry operatively associated with the transceiver circuitry and configured to execute processes of:

notifying information relating to slice-specific cell reselection from a first layer of the user equipment to a second layer, of the user equipment, higher than the first layer; and performing, by the first layer of the user equipment in an RRC idle state or an RRC inactive state, slice-specific cell reselection; wherein the notifying to the second layer includes notifying, by the first layer, the second layer of a completion notification when the first layer completes the slice-specific cell reselection.

* * * * *